US012112699B2

(12) United States Patent
Lee et al.

(10) Patent No.: US 12,112,699 B2
(45) Date of Patent: Oct. 8, 2024

(54) PIXEL DRIVING CIRCUIT HAVING REDUCED NUMBER OF CONTACTS

(71) Applicant: SAPIEN SEMICONDUCTORS INC., Ulsan (KR)

(72) Inventors: Jae Hoon Lee, Busan (KR); Ji Han Kim, Seoul (KR)

(73) Assignee: SAPIEN Semiconductors Inc., Gyeonggi-do (KR)

( * ) Notice: Subject to any disclaimer, the term of this patent is extended or adjusted under 35 U.S.C. 154(b) by 0 days.

(21) Appl. No.: 18/032,461

(22) PCT Filed: Dec. 2, 2021

(86) PCT No.: PCT/KR2021/018091
§ 371 (c)(1),
(2) Date: Apr. 18, 2023

(87) PCT Pub. No.: WO2022/119341
PCT Pub. Date: Jun. 9, 2022

(65) Prior Publication Data

US 2023/0395021 A1 Dec. 7, 2023

(30) Foreign Application Priority Data

Dec. 4, 2020 (KR) ........................ 10-2020-0168352

(51) Int. Cl.
*G09G 3/3233* (2016.01)

(52) U.S. Cl.
CPC ... *G09G 3/3233* (2013.01); *G09G 2310/0286* (2013.01); *G09G 2310/08* (2013.01)

(58) Field of Classification Search
CPC ......... G09G 3/3233; G09G 2310/0286; G09G 2310/08; G09G 3/2022; G09G 2300/0426; G09G 2310/0243; G09G 3/32
See application file for complete search history.

(56) References Cited

U.S. PATENT DOCUMENTS

2009/0111244 A1* 4/2009 Yamazaki ........... H01L 27/1214 257/E21.568
2021/0142716 A1* 5/2021 Robin ..................... H01L 24/80

FOREIGN PATENT DOCUMENTS

KR 10-2006-0088697 A 8/2006
KR 10-2013-0090825 A 8/2013
(Continued)

OTHER PUBLICATIONS

International Search Report for PCT/KR2021/018091, dated Mar. 21, 2022.

*Primary Examiner* — Temesghen Ghebretinsae
*Assistant Examiner* — Karin Kiyabu
(74) *Attorney, Agent, or Firm* — You & IP, LLC

(57) ABSTRACT

The present specification discloses a pixel driving circuit having a reduced number of external contacts. A conventional digital driving pixel requires two contacts (Vcc, GND) related to power, a contact (row signal, column signal) for inputting two signals for digital driving, a contact (mode selection) for inputting a set value required for driving the pixel, and a contact (reset) for maintaining video data for one frame to implement a cycle function during PWM driving and for inputting a reset signal to clear previous video data before inputting new video data. However, the higher the number of contacts, the lower the efficiency of pick & place in the manufacturing process. Thus, in the present specification, a pixel driving circuit is proposed, which can be digitally driven even when the number of contacts is reduced through combination of a row signal and a column signal.

18 Claims, 13 Drawing Sheets

(56) References Cited

FOREIGN PATENT DOCUMENTS

| | | | |
|---|---|---|---|
| KR | 10-2016-0114757 | A | 10/2016 |
| KR | 10-2018-0079699 | A | 7/2018 |
| KR | 10-2019-0005518 | A | 1/2019 |
| KR | 10-2020-0026285 | A | 3/2020 |
| KR | 10-2108516 | B1 | 5/2020 |
| KR | 10-20137636 | B1 | 7/2020 |
| KR | 10-2020-0097940 | A | 8/2020 |
| KR | 10-2238445 | B1 | 4/2021 |

* cited by examiner

PIXEL DRIVING CIRCUIT HAVING REDUCED NUMBER OF CONTACTS

CROSS REFERENCE TO RELATED APPLICATIONS

This application is a National Stage of International Application No. PCT/KR2021/018091 filed Dec. 2, 2021, claiming priority based on Korean Patent Application No. 10-2020-0168352 filed Dec. 4, 2020.

TECHNICAL FIELD

The present disclosure relates to a display device, and more particularly, to an operation of a pixel driving circuit having a reduced number of contacts compared to that of the related art.

BACKGROUND ART

This application is an application claiming priority of Korean patent application No. 10-2020-0168352, filed on Dec. 4, 2020, and all contents disclosed in the specification and drawings of the application are incorporated herein by reference.

The statements in this section merely provide background information related to the present disclosure and may not constitute prior art.

Various types of display devices such as liquid crystal display devices, plasma display devices, and organic light-emitting display devices or the like are in use. Recently, interest in display devices using micro-light-emitting diodes (μLEDs) is increasing since display devices used in smart watches or virtual reality (VR), augmented reality (AR), and mixed reality (MR) devices are required to have a small size and high resolution as well. In addition, micro LEDs are also commercialized in large display devices.

Meanwhile, when a large display device using micro LEDs is driven in a passive matrix method, enormous power consumption is required, and thus the passive matrix method is not suitable as a driving method for a next-generation display device. Accordingly, an active matrix method having a relatively small amount of power consumption is more suitable for a next-generation display device.

FIG. 1 is a circuit diagram schematically illustrating a structure of a typical pixel.

Referring to FIG. 1, a pixel 10 including three light-emitting elements R, G, and B and a pixel driving circuit 11 for driving the light-emitting elements may be confirmed. Pixels driven by an active matrix method generally use digital driving using a pulse width modulation (PWM) technology. Accordingly, in the pixel 10, two contacts Vcc and GND related to power required for driving the pixel and contacts Row signal and Column signal for inputting two signals for digital driving are essential. Additionally, a contact Mode selection for inputting a set value required for driving the pixel is required, and also, a contact Reset for maintaining video data for one frame to implement a cycle function during PWM driving and inputting a reset signal to clear previous video data before inputting new video data is required.

Meanwhile, in order to manufacture an active-matrix type display device, a method of using an existing thin-film transistor (TFT) backplane and a method of configuring a pixel driving circuit on a semiconductor wafer and attaching micro LEDs are possible. In particular, when configuring the pixel driving circuit on the semiconductor wafer, it is necessary to minimize the number of required contacts to improve pick-and-place efficiency. However, a plurality of contacts as shown in FIG. 1 increase difficulty in a pick-and-place process by increasing the number of pins, cause a problem of increasing the size of the pixel driving circuit, and reduce price competitiveness.

DESCRIPTION OF EMBODIMENTS

Technical Problem

The present disclosure is directed to providing a pixel driving circuit having a reduced number of external contacts.

The present specification is not limited to the above-mentioned problems, and other problems which are not mentioned will be clearly understood by those skilled in the art from the following disclosure.

Technical Solution to Problem

One aspect of the present disclosure provides a pixel driving circuit including a pixel internal memory unit including a plurality of memory cells for storing a setting value related to pixel driving and video data, a signal detection unit including a row signal input terminal and a column signal input terminal, a first low-pass filter configured to output a signal having a frequency lower than a preset first cutoff frequency from a signal input from the signal detection unit, and a second low-pass filter configured to output a signal, which has a frequency lower than a preset second cutoff frequency from the signal input from the signal detection unit, to the pixel internal memory unit.

According to an embodiment of the present specification, the signal output from the first low-pass filter may be input to a data input terminal of the pixel internal memory unit for storing data.

According to an embodiment of the present specification, the signal output from the signal detection unit may be input to a clock terminal of the pixel internal memory unit for receiving a clock signal.

According to an embodiment of the present specification, the signal output from the second low-pass filter may be input to a reset terminal of the pixel internal memory unit for deleting the data stored in the memory cell.

The pixel internal memory unit according to an embodiment of the present specification may include a single flag memory cell for storing a mode value, a setting data shift register having a plurality of memory cells for storing the setting value related to pixel driving, and K video data shift registers corresponding to the number of light-emitting elements for storing the video data.

The flag memory cell according to an embodiment of the present specification may be disposed farthest from a data input terminal of the pixel internal memory unit.

The pixel internal memory unit according to an embodiment of the present specification may output the mode value stored in the flag memory cell to the signal detection unit. In this case, the signal detection unit may output the column signal when the mode value corresponds to a first mode, and output the row signal when the mode value corresponds to a second mode.

The pixel driving circuit according to an embodiment of the present specification may further include K output switching elements connected to one ends of the video data shift registers, respectively, to output stored data to the respective corresponding light-emitting elements, and K cycling switching elements connected between the one ends and the other ends of each of the video data shift registers to re-input data output from the one ends to the other ends, respectively.

The video data shift registers according to an embodiment of the present specification may respectively further include a plurality of pulse width modulation (PWM) end memory cells for ending PWM driving of each of the light-emitting elements.

Each of the PWM end memory cells according to an embodiment of the present specification may be located adjacent to a least significant bit (LSB) of the video data of a corresponding light-emitting element.

The pixel driving circuit according to the present specification may be one component of a pixel circuit including a pixel driving circuit and a plurality of light-emitting elements.

The pixel circuit according to the present specification may be one component of a display device including a display panel in which a plurality of pixel circuits are arranged, a scan driving circuit configured to output a row signal through a plurality of scan lines connected to row signal input terminals of the pixel circuits arranged in a row direction, and a data driving circuit configured output a column signal through a plurality of data lines connected to column signal input terminals of the pixel circuits arranged in a column direction.

The row signal according to an embodiment of the present specification may include a first scan signal for inputting to the pixel internal memory unit, a second scan signal for inputting setting value data related to pixel driving and video data, and a clock signal for pulse width modulation (PWM) driving.

The first scan signal according to an embodiment of the present specification may be a signal having a frequency lower than a cutoff frequency of the second low-pass filter.

The second scan signal according to an embodiment of the present specification may be a signal having a frequency lower than a cutoff frequency of the first low-pass filter and higher than a cutoff frequency of the second low-pass filter.

The clock signal for PWM driving according to an embodiment of the present specification may be a signal having a frequency higher than a cutoff frequency of the first low-pass filter.

The scan driving circuit according to an embodiment of the present specification may output a row signal, in which M clock signals are repeated, after one second scan signal according to an M-cycling operation mode.

The column signal according to an embodiment of the present specification may include a mode value data signal, a setting value data signal, and a video data signal.

According to an embodiment of the present specification, a most significant bit (MSB) of data included in the column signal may be a mode value.

The video data according to an embodiment of the present specification may include L-bit gradation data corresponding to a gradation of each of the light-emitting elements and 1-bit data of "0" as PWM end data.

Other specific details of the present disclosure are included in the detailed descriptions and the drawings.

Advantageous Effects of Disclosure

According to an aspect of the present specification, the number of external contacts of a pixel driving circuit can be reduced, so that efficiency of the process of forming and transferring (pick-and-place) the pixel driving circuit on a semiconductor wafer can be improved.

According to another aspect of the present specification, as the number of external contacts of a pixel driving circuit is reduced, the difficulty of a transfer process can be lowered and the size of the pixel driving circuit can be reduced, so that price competitiveness can be improved.

Effects of the present disclosure are not limited to the above-mentioned effect, and other effects which are not mentioned will be clearly understood by those skilled in the following disclosure.

MODE OF DISCLOSURE

Figure 1:
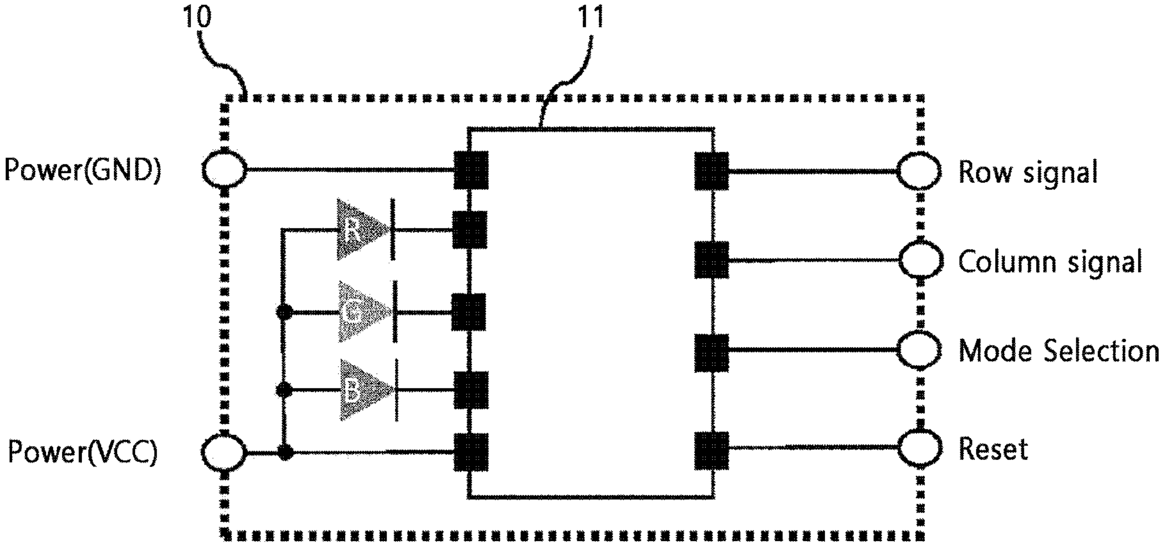
FIG. 1 is a circuit diagram schematically illustrating a structure of a typical pixel.

Advantages and features of the present disclosure which are described in the present specification, and a method of achieving them will be apparent with reference to embodiments which are described later in detail in conjunction with the accompanying drawings. However, the present specification is not limited to the embodiments which will be disclosed later, but may be implemented in various different forms, and only the present embodiments allow the disclosure of the present specification to be complete, and the embodiments are only provided so that the disclosure of the present specification is complete, and to fully inform those of ordinary skill in the art to which this specification belongs (hereinafter, referred to as "those skilled in the art"), and the scope of the present specification is only defined by the scope of the claims.

Terms used in the present specification are provided not to limit the scope of the present specification but to describe the embodiments. In the present specification, the singular form is intended to also include the plural form unless the context clearly indicates otherwise. The terms "comprise" and/or "comprising" as used herein do not preclude the presence or addition of one or more other components other than the above-mentioned components.

The same reference numerals refer to the same or similar components throughout the present specification, and the term "and/or" includes each component and all combinations of one or more of the above-mentioned components. Although "first", "second", and the like are used to describe various components, these components are not limited by these terms. These terms are only used to distinguish one component from another. Accordingly, a first component mentioned below may be a second component within the spirit of the present disclosure.

The present specification describes embodiments using elements of a logic circuit and an electronic circuit. For convenience of understanding, descriptions will be made using an embodiment in which data "1" corresponds to a logic high and data "0" corresponds to a logic low. However, the opposite case is also possible, and hereinafter, embodiments of the present disclosure will be described in detail with reference to the accompanying drawings.

Figure 2:
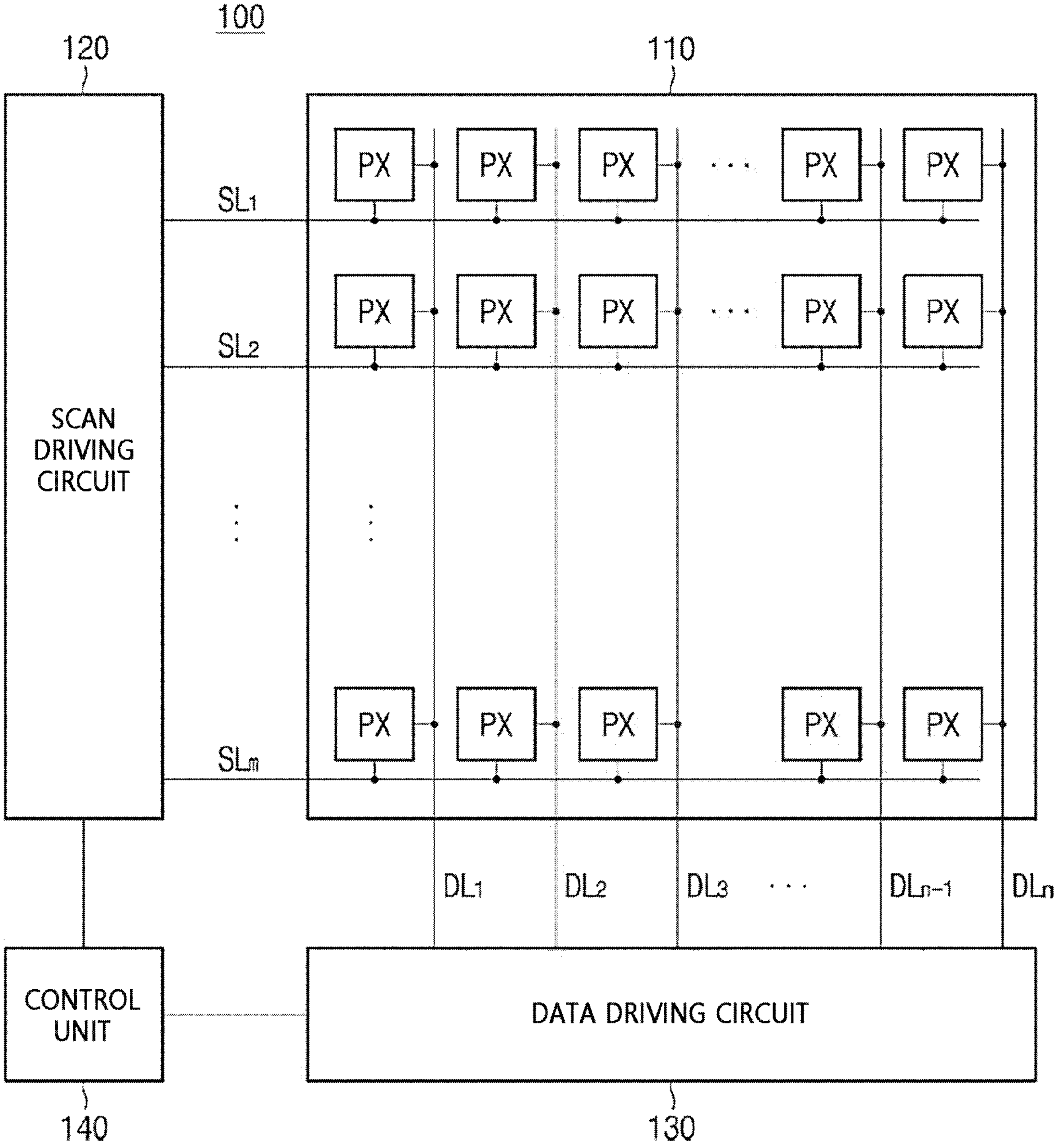
FIG. 2 is a block diagram schematically illustrating a configuration of a display device according to the present specification.

FIG. 2 is a block diagram schematically illustrating a configuration of a display device according to the present specification.

Referring to FIG. 2, a display device 100 according to the present specification may include a display panel 110, a scan driving circuit 120, a data driving circuit 130, and a control unit 140.

The display panel 110 may include a plurality of pixel circuits PX according to the present specification. The plurality of pixel circuits PX in a number of m×n (m and n are natural numbers) may be arranged in a matrix form. However, a pattern in which the plurality of pixel circuits are arranged may be arranged in various patterns according to embodiments, such as a zigzag type and the like.

The display panel 110 may be implemented as one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), and may be implemented as other types of flat panel displays or flexible displays. In the present specification, an LED display panel will be described as an example.

Each of the pixel circuits PX may include a plurality of light-emitting elements. The light-emitting element may be a light-emitting diode (LED). The light-emitting diode may be a micro LED having a size of 80 μm or less. One pixel circuit PX may output various colors through a plurality of light-emitting elements having different colors. As an example, one pixel circuit PX may include a red light-emitting element, a green light-emitting element, and a blue light-emitting element. As another example, when a white light-emitting element is able to be further included, the white light-emitting element may replace any one of the red, green, and blue light-emitting elements. Each light-emitting element included in one pixel circuit PX is referred to as a "sub-pixel."

Each pixel circuit PX may include a pixel driving circuit that drives a plurality of sub-pixels. The pixel driving circuit may drive a turn-on or turn-off operation of the sub-pixel according to control signals of a row signal output from the scan driving circuit 120 and/or a column signal output from the data driving circuit 130. The pixel driving circuit may include at least one thin-film transistor, at least one capacitor, and the like. The pixel driving circuit may be implemented by a stacked structure on a semiconductor wafer.

The display panel 110 may include scan lines $SL_1$ to $SL_m$ arranged in a row direction and data lines $DL_1$ to $DL_n$ arranged in a column direction. The pixel circuits PX may be located at intersections of the scan lines $SL_1$ to $SL_m$ and the data lines $DL_1$ to $DL_n$. Each pixel circuit PX may be connected to any one scan line $SL_k$ and any one data line $DL_k$. The scan lines $SL_1$ to $SL_m$ may be connected to the scan driving circuit 120, and the data lines $DL_1$ to $DL_n$ may be connected to the data driving circuit 130.

The scan driving circuit 120 may output a row signal through a plurality of scan lines $SL_1$ to $SL_m$ connected to row signal input terminals of the pixel circuits arranged in the row direction. Preferably, the scan driving circuit 120 may sequentially output the row signal to the scan lines $SL_1$ to $SL_m$. For example, the pixels connected to a first scan line $SL_1$ may be driven during a first scan driving period, and the pixels connected to a second scan line $SL_2$ may be driven during a second scan driving period. An operation of the scan driving circuit 120 according to the present specification will be described in more detail later.

The data driving circuit 130 may output a column signal through a plurality of data lines $DL_1$ to $DL_n$ connected to column signal input terminals of the pixel circuits arranged in the column direction. The column signal includes data related to gradation for each pixel circuit. While one data line is connected to the plurality of pixel circuits in a longitudinal direction, the column signal may be input only to the pixel circuit connected to the scan line selected by the scan driving circuit 120. An operation of the data driving circuit 130 according to the present specification will be described in more detail later.

The control unit 140 may output a control signal so that operations of the scan driving circuit 120 and the data driving circuit 130 are performed. The control unit 140 may output a control signal corresponding to image data corresponding to one image frame to each of the scan driving circuit 120 and the data driving circuit 130.

Figure 3:
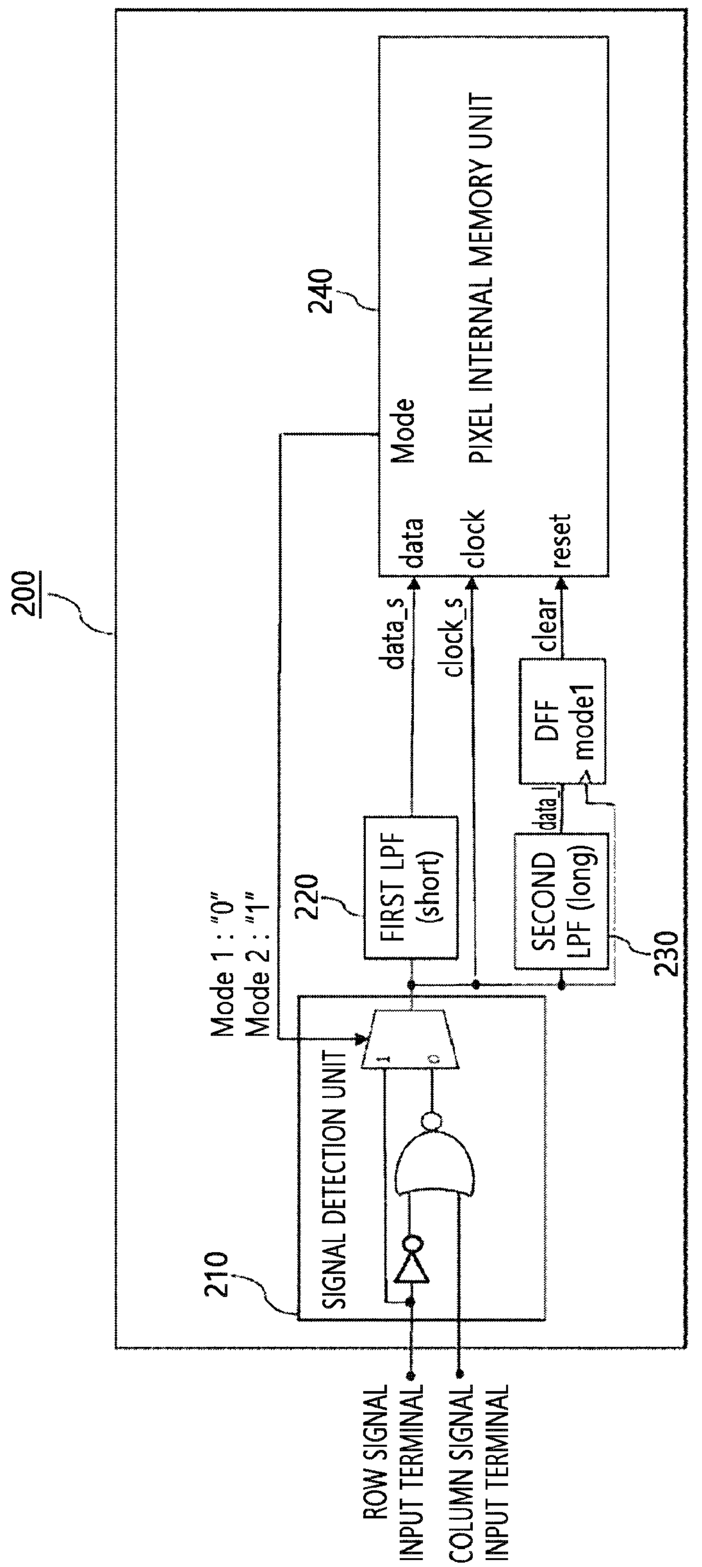
FIG. 3 is a block diagram schematically illustrating a configuration of a pixel driving circuit according to the present specification.

FIG. 3 is a block diagram schematically illustrating a configuration of a pixel driving circuit according to the present specification.

Referring to FIG. 3, a pixel driving circuit 200 according to the present specification may include a signal detection unit 210, a first low-pass filter 220, a second low-pass filter 230, and a pixel internal memory unit 240.

The signal detection unit 210 may include a row signal input terminal to which a row signal output from the scan driving circuit 120 is input and a column signal input terminal to which a column signal output from the data driving circuit 130 is input. The row signal or column signal input to the signal detection unit 210 may be output to the first low-pass filter 220, the second low-pass filter 230, and the pixel internal memory unit 240. Which one of the row signal or the column signal input to the signal detection unit 210 is to be output may vary depending on an operation mode. In order to control the signal to be output according to the operation mode, the signal detection unit 210 may be configured using logic circuit elements and a multiplexer as shown in FIG. 3.

The first low-pass filter 220 is a low-pass filter that outputs a signal, which has a frequency lower than a preset first cutoff frequency from the signal input from the signal detection unit 210, to the pixel internal memory unit 240.

The second low-pass filter 230 is a low-pass filter that outputs a signal, which has a frequency lower than a preset second cutoff frequency from the signal input from the signal detection unit 210, to the pixel internal memory unit 240.

The first cutoff frequency may have a larger frequency value (Hz) than the second cutoff frequency. On the contrary, the second cutoff frequency may have a smaller frequency value (Hz) than the first cutoff frequency. Accordingly, a long signal in which a logic high is maintained for a relatively long time may pass through the second low-pass filter 230, and a short signal in which the logic high is maintained for a relatively short time may not pass through the second low-pass filter 230 but only pass through the first low-pass filter 220. The first cutoff frequency and the second cutoff frequency may be designed according to a difference in a logic high maintaining time to be set, by those skilled in the art.

The pixel internal memory unit 240 may have a plurality of memory cells for storing setting values related to pixel driving and video data. In the present specification, a memory cell refers to a circuit element for storing 1-bit data, and the memory cell according to the present specification may be implemented by using various memory elements known to those skilled in the art. In the present specification, an example in which a 1-bit memory cell and shift registers are implemented using flip-flops (FFs) is presented, but the pixel driving circuit according to the present specification is not limited to the above example.

Meanwhile, the pixel internal memory unit 240 may include a data input terminal data for storing data, a clock terminal clock for receiving a clock signal, and a reset terminal reset for deleting data stored in the memory cell. A connection may be formed such that a signal output from the first low-pass filter 220 is input to the data input terminal of the pixel internal memory unit. A connection may be formed such that a signal output from the signal detection unit 210 is input to the clock terminal of the pixel internal memory unit. A connection may be formed such that a signal output from the second low-pass filter 230 is input to the reset terminal of the pixel internal memory unit.

Figure 4:
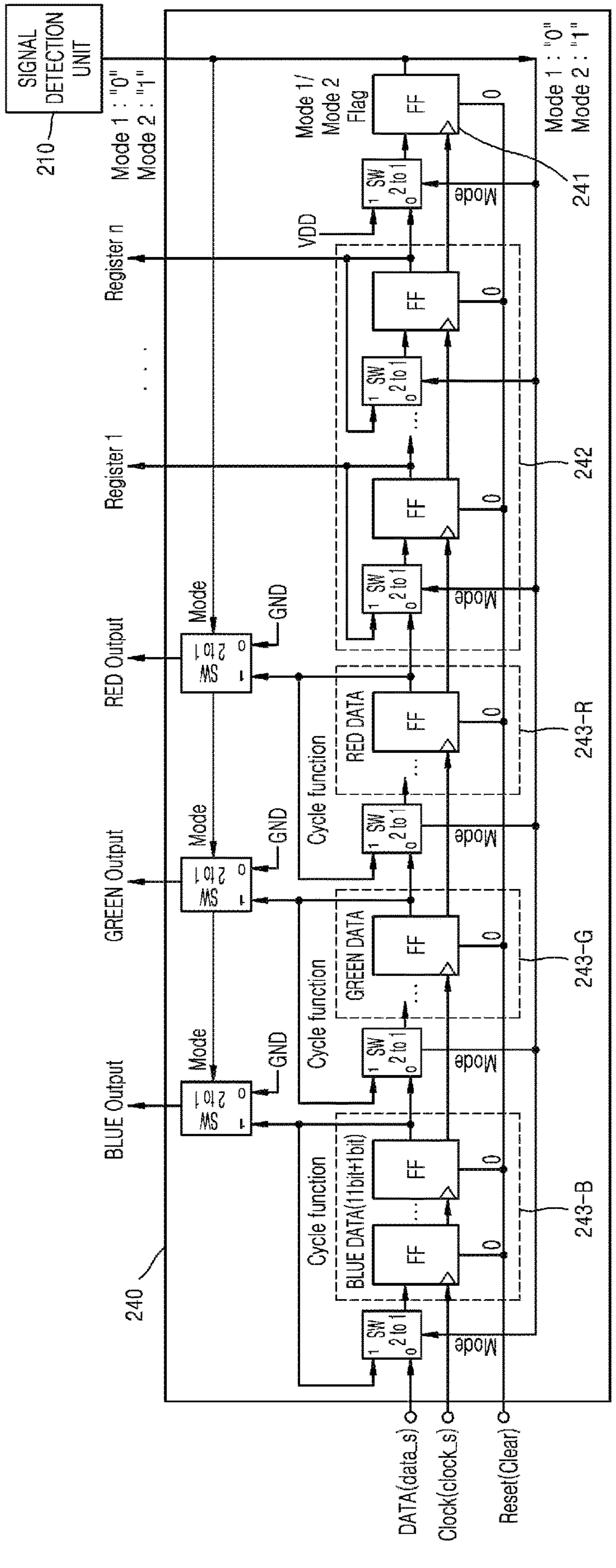
FIG. 4 is a block diagram schematically illustrating a configuration of a pixel internal memory unit according to the present specification.

FIG. 4 is a block diagram schematically illustrating a configuration of the pixel internal memory unit according to the present specification.

Referring to FIG. 4, the pixel internal memory unit 240 according to the present specification may include a flag memory cell 241, a setting data shift register 242, and video data shift registers 243.

The flag memory cell 241 is a single memory cell for storing a mode value. The flag memory cell 241 may store a value corresponding to a first mode or a second mode according to the present specification. As shown in FIG. 4, the flag memory cell 241 may be disposed farthest from the data input terminal data of the pixel internal memory unit 240.

According to an embodiment of the present specification, the pixel internal memory unit 240 may output a mode value stored in the flag memory cell 241 to the signal detection unit 210. The signal output to the signal detection unit 210 may be a DeMUX select signal for selecting an input terminal of a multiplexer MUX. In the present specification, when the mode value stored in the flag memory cell 241 is "0," the mode will be referred as the "first mode," and when the mode value stored in the flag memory cell 241 is "1," the mode will be referred to as the "second mode." In this case, the signal detection unit 210 may output the column signal when the mode value corresponds to the first mode and output the row signal when the mode value corresponds to the second mode. Characteristics of the column signal and the row signal for the above operation will be described in more detail later.

The setting data shift register 242 may have a plurality of memory cells for storing setting values related to pixel driving. The data size of the setting value may vary according to the size of the setting value such as 19 bits and 12 bits. Accordingly, the number of the memory cells included in the setting data shift register 242 may also vary.

The video data shift registers 243 may have k shift registers 243 corresponding to the number of light-emitting elements in order to store video data. The video data refers to data related to a gradation to be expressed by turning on/off the light-emitting element during one frame. The number of the light-emitting elements in the pixel may vary, and in the present specification, three light-emitting elements related to red-green-blue (RGB) are illustrated as an example. In addition, it is illustrated that each light-emitting element has 11-bit gradation data. The number of the light-emitting elements and the size of the gradation data may vary.

The configuration and timing of each of the row signal and the column signal will now be described. The row signal is a signal output from the scan driving circuit 120 according to the present specification, and the column signal is a signal output from the data driving circuit 130 according to the present specification. Output timings of the row signal and the column signal may be controlled by the control unit 140 according to the present specification.

Figure 5:
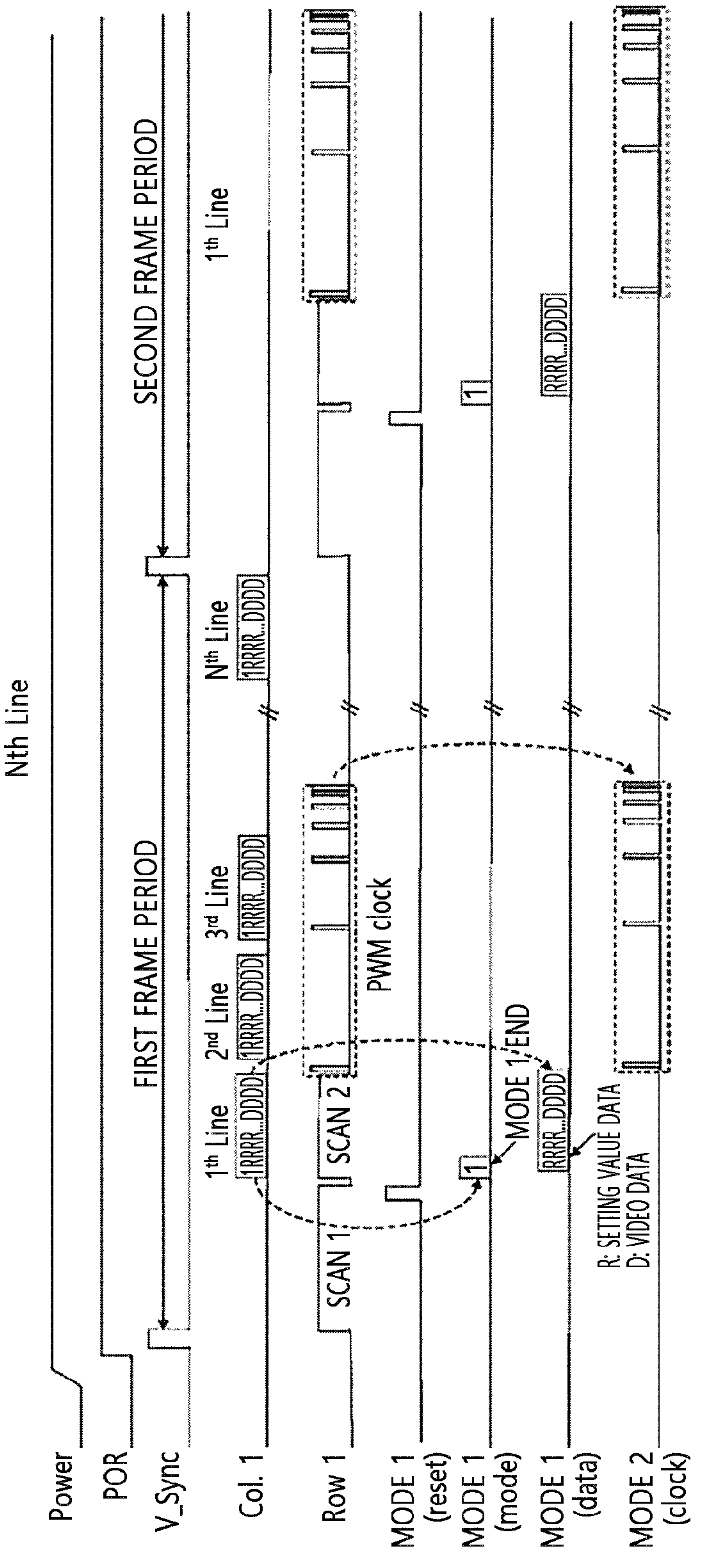
FIG. 5 is a reference diagram of timings of a row signal and a column signal according to the present specification.

FIG. 5 is a reference diagram of timings of the row signal and the column signal according to the present specification.

Referring to FIG. 5, a power-on-reset (POR) signal may first be input immediately when power is applied, and may be maintained continuously in a logic high state. In addition, a frame sync signal V_sync of a screen may be periodically output according to a preset interval. The row signal and the column signal may be input to the pixel driving circuit 200 according to an output timing of the frame sync signal V_sync.

The timings of the signals shown in FIG. 5 are timings for a column signal Col. 1 and a row signal Row 1 input to the pixel driving circuit disposed at a 1×1 position among the plurality of pixel circuits arranged in the display panel. The other remaining pixel driving circuits are different only in input timings according to the arranged positions, and the configuration of each row signal and each column signal is the same.

The row signal may include a first scan signal SCAN 1 for inputting a setting value related to pixel driving, a second scan signal SCAN 2 for inputting video data, and a clock signal PWM clock for pulse width modulation (PWM) driving.

The first scan signal SCAN 1 may be a signal having a frequency lower than a cutoff frequency of the second low-pass filter 230. Accordingly, the first scan signal SCAN 1 may pass through the second low-pass filter 230.

The second scan signal SCAN 2 may be a signal having a frequency lower than a cutoff frequency of the first low-pass filter 220 and higher than the cutoff frequency of the second low-pass filter 230. Accordingly, the second scan signal SCAN 2 may not pass through the second low-pass filter 230 and may pass through the first low-pass filter 220.

The clock signal PWM clock for PWM driving may be a signal having a frequency higher than the cutoff frequency of the first low-pass filter 220. Accordingly, the clock signal PWM clock for PWM driving may not pass through both the first low-pass filter 220 and the second low-pass filter 230.

The column signal may include a mode value data signal, a setting value data signal related to pixel driving, and a video data signal related to the plurality of light-emitting elements. In this case, a most significant bit (MSB) of the data included in the column signal may be the mode value.

Figure 7:
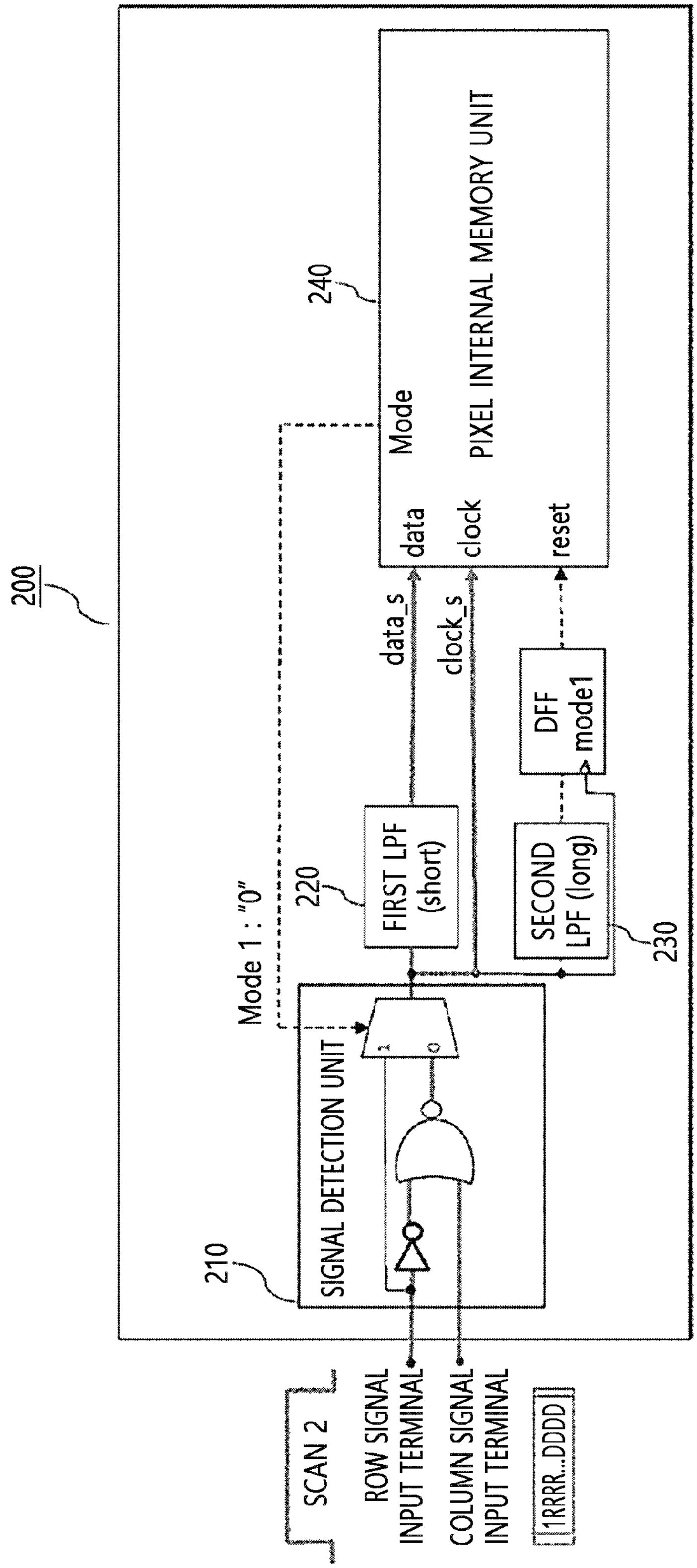
FIG. 7 is a reference diagram of a second operation in Mode 1.
Figure 8:
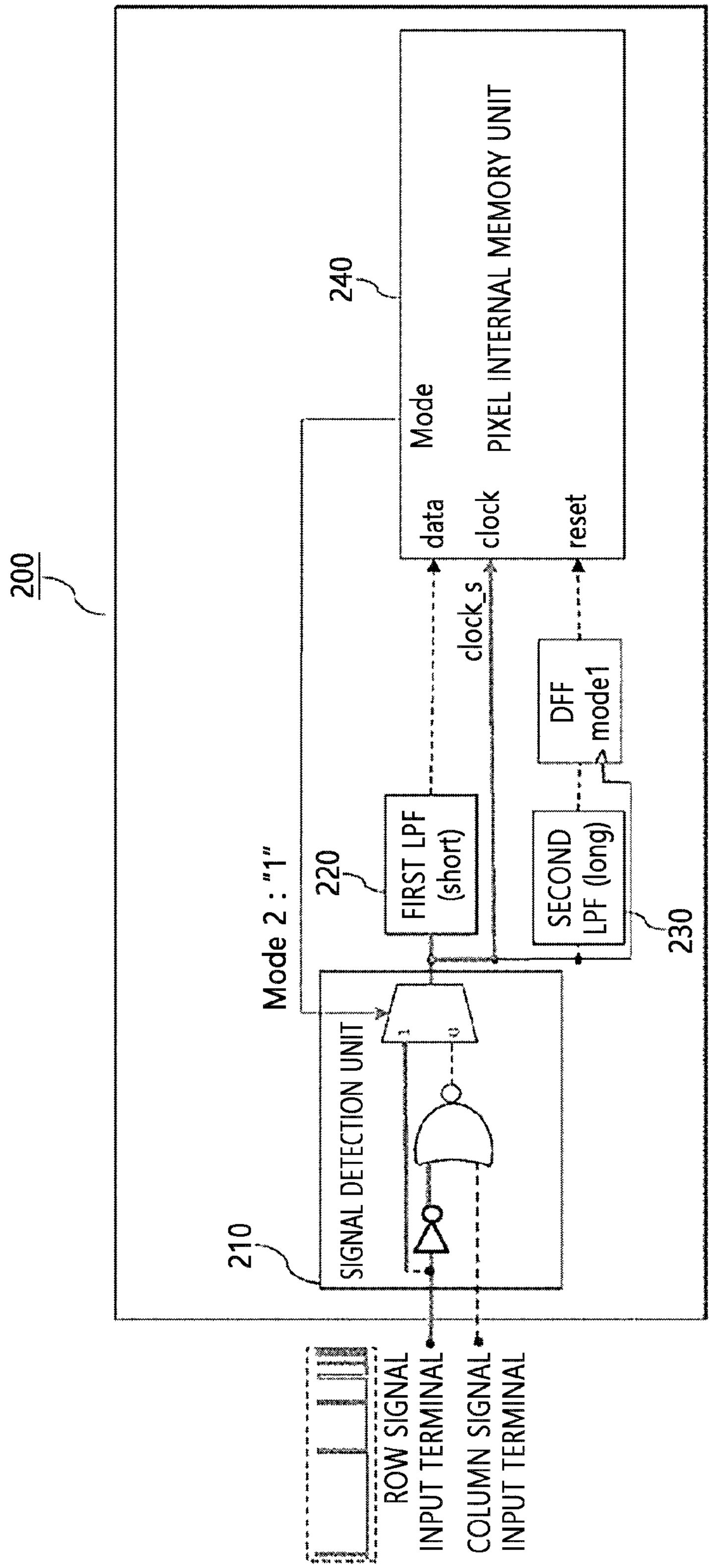
FIG. 8 is a reference diagram of an operation in Mode 2.

The order in which the pixel driving circuit 200 according to the present specification operates, that is, the order in which Mode 1 and Mode 2 operate according to the row signal and the column signal described above will now be described. A path through which the input signal is output in each mode will be described below with reference to FIGS. 6 to 8. Since the pixel driving circuit 200 illustrated in FIGS. 6 to 8 is the same as the pixel driving circuit 200 illustrated in FIG. 3, a repeated description of each configuration is omitted.

Meanwhile, it is assumed that all elements included in the pixel driving circuit 200 are in an initial state, in a state in which the POR signal is applied. That is, it is assumed that the input terminal of the multiplexer MUX included in the signal detection unit 210 is selected at "0," and data stored in all the memory cells included in the pixel internal memory unit 240 has "0." The POR signal may be a signal that is input immediately when power is supplied to operate the display device.

Figure 6:
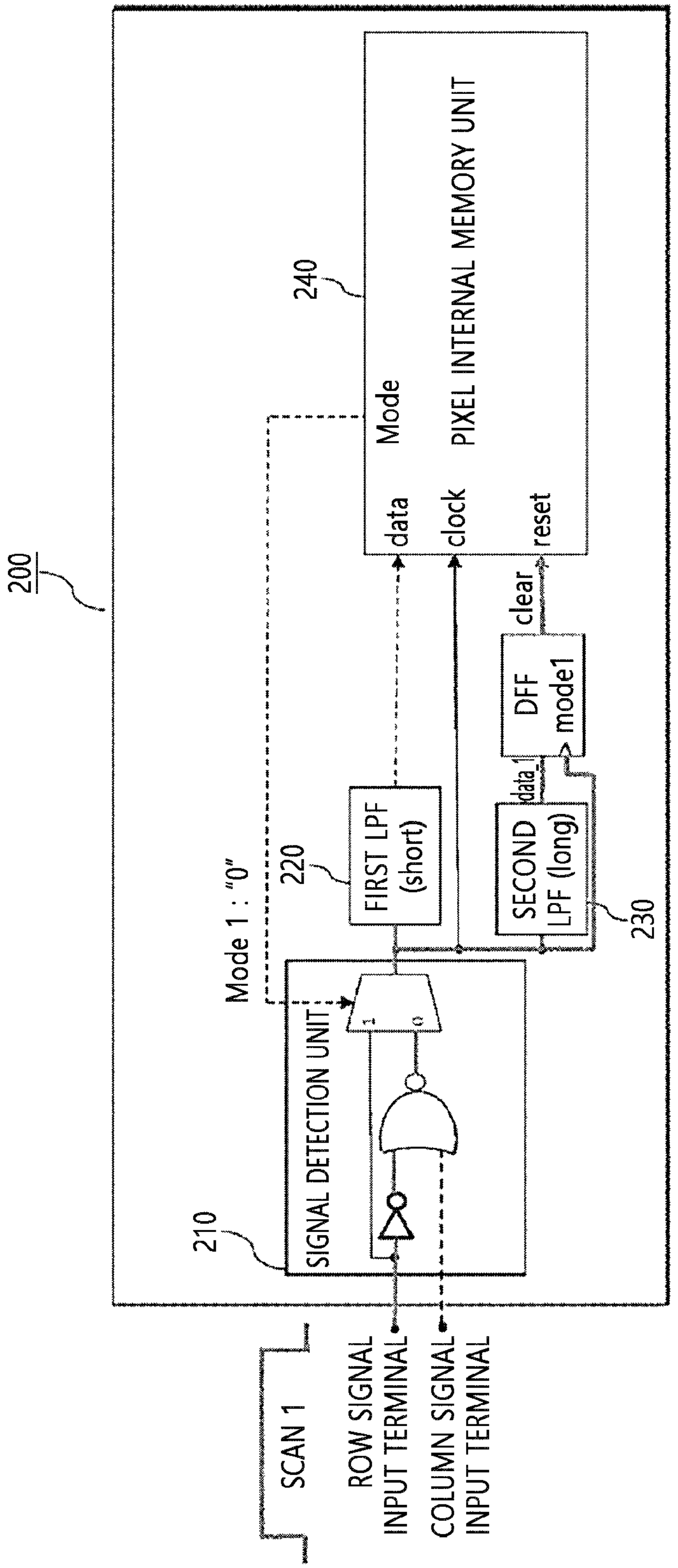
FIG. 6 is a reference diagram of a first operation in Mode 1.

FIG. 6 is a reference diagram of a first operation in Mode 1.

Referring to FIG. 6, the first scan signal SCAN 1 output from the scan driving circuit 120 is input to the row signal input terminal. The first scan signal SCAN 1 may be input to the reset terminal reset of the pixel internal memory unit 240 via the signal detection unit 210 and the second low-pass filter 230. To this end, an output terminal of the second low-pass filter 230 may be connected to a flip-flop DFF configured to convert a signal data_I having a long logic high into a pulse signal clear. The first scan signal SCAN 1 may serve to delete data of a previous frame stored in the pixel internal memory unit 240.

FIG. 7 is a reference diagram of a second operation in Mode 1.

Referring to FIG. 7, the second scan signal SCAN 2 output from the scan driving circuit 120 is input to the row signal input terminal, and a column signal of 1RRRR . . . DDDD output from the data driving circuit 130 may be input to the column signal input terminal. The column signal is represented as "1", which is in an MSB and is a mode value, "R", which is a setting value, and "D" that is video data.

Figure 9:
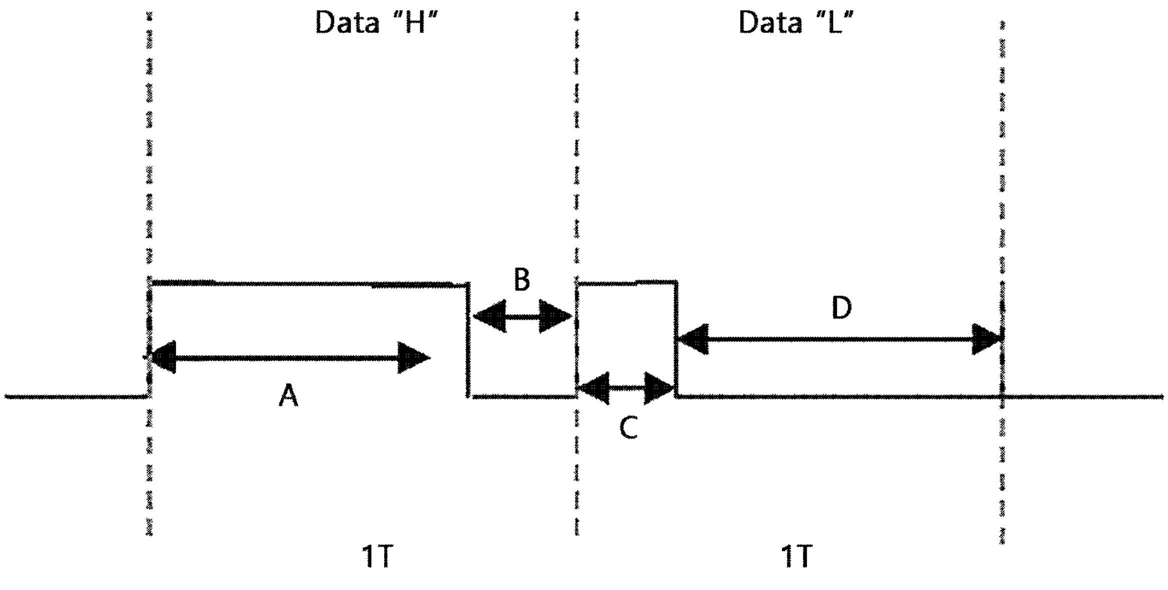
FIG. 9 is reference diagram of a data signal in a column signal according to the present specification.

FIG. 9 is reference diagram of a data signal in the column signal according to the present specification.

Referring to FIG. 9, video data of "H" and video data of "L" each displayed for a preset time period T may be confirmed. A length of the time period T to distinguish 1 bit from the video data signal of data "H" and data "L" may be set such that the signal included in the time period has a higher frequency than the second cutoff frequency of the second low-pass filter 230. Thus, the column signal may not pass through the second low-pass filter 230.

Figure 10:
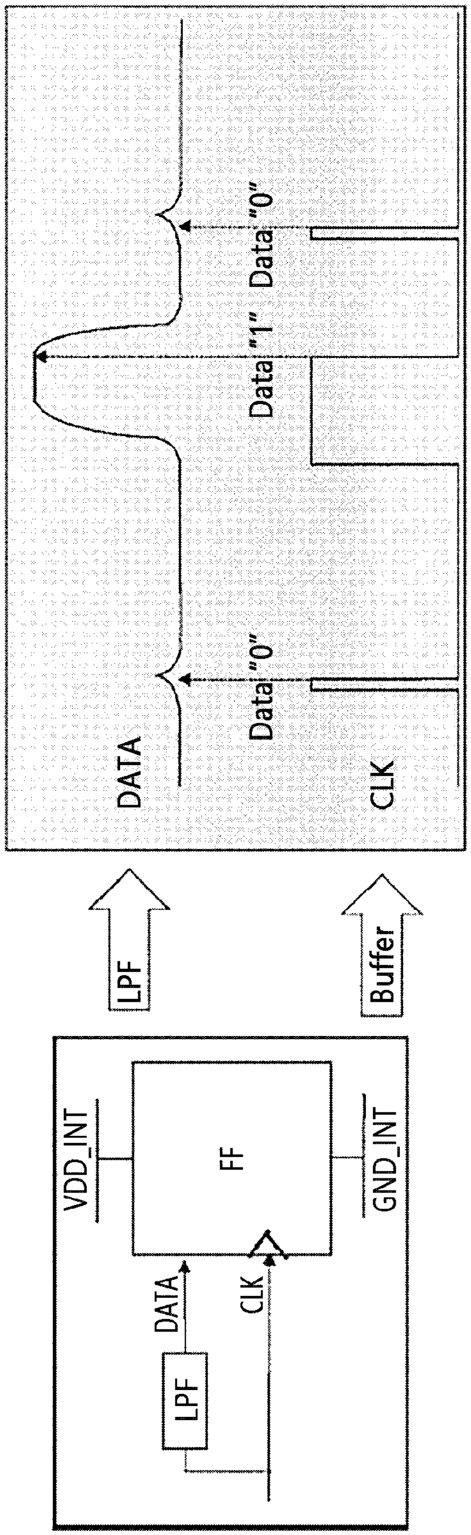
FIG. 10 is a reference diagram illustrating a case in which data "1" and data "0" are stored in a memory cell according to the present specification.

FIG. 10 is a reference diagram illustrating a case in which data "1" and data "0" are stored in the memory cell according to the present specification.

Referring to FIGS. 9 and 10 together, within the preset reference time T, values of the video data according to the present specification may include a signal having a frequency lower than the cutoff frequency of the first low-pass filter 220 and a signal having a frequency higher than the cutoff frequency of the first low-pass filter 220. That is, data "1" has a logic high with a relatively long maintaining time A so as to have the frequency lower than the cutoff frequency of the first low-pass filter 220, and data "0" has a logic high with a relatively short maintaining time C so as to have the frequency higher than the cutoff frequency of the first low-pass filter 220. In FIG. 10, a signal waveform after the video data signal having the above characteristics passes through the first low-pass filter 220 is illustrated. The video data signal before passing through the first low-pass filter 220 has a logic high in both "1" and "0," but the video data signal after passing through the first low-pass filter 220 is divided into a logic low for "0" and a logic high for "1." Accordingly, the video data may be stored in the memory cells 241, 242, and 243 of the pixel internal memory unit 240 as "1" and "0." Meanwhile, the signal, which is output from the signal detection unit 210 and not passed through the first low-pass filter 220, may operate as a clock signal clock_s because a pulse thereof is input without being deformed.

Referring to FIG. 7 again, the column signal of 1RRR . . . DDDD may be input to the data input terminal data of the pixel internal memory unit 240 via the signal detection unit 210 and the first low-pass filter 220 for a time during which the second scan signal SCAN 2 is maintained at a logic high. In addition, the signal output from the signal detection unit 210 is input the clock terminal clock of the pixel internal memory unit 240 and operates as the clock signal clock_s. Accordingly, the column signal of 1RRR . . . DDDD may be stored in all the memory cells included in the pixel internal memory unit 240.

FIG. 8 is a reference diagram of an operation in Mode 2.

Referring to FIG. 8, a state is illustrated in which a mode value of "1" is stored in the flag memory cell 241 of the pixel internal memory unit 240. The mode value of "1" is output to the multiplexer MUX included in the signal detection unit 210, and Mode 1 is changed to Mode 2.

The clock signal for PWM driving output from the scan driving circuit 120 is input to the row signal input terminal. Although a video data signal for the other pixel driving circuits arranged in the column direction is input to the column signal input terminal, since the multiplexer MUX included in the signal detection unit 210 is set to output only the signal input to the row signal input terminal, Mode 2 is not affected by the signal input to the column signal input terminal.

The clock signal for PWM driving may be configured in the scan driving circuit 120 as a pulse signal having a relatively high-frequency characteristic compared to the video data signal, and may be blocked by the first low-pass filter 220. Accordingly, the clock signal for PWM driving may pass through the signal detection unit 210 and may be input to the clock terminal clock of the pixel internal memory unit 240. Thereafter, the pixel internal memory unit 240 may operate so that the light-emitting element (e.g., an LED) is PWM-driven according to the timing of the clock signal in accordance with the video data stored in the memory cells 243.

Figure 11:
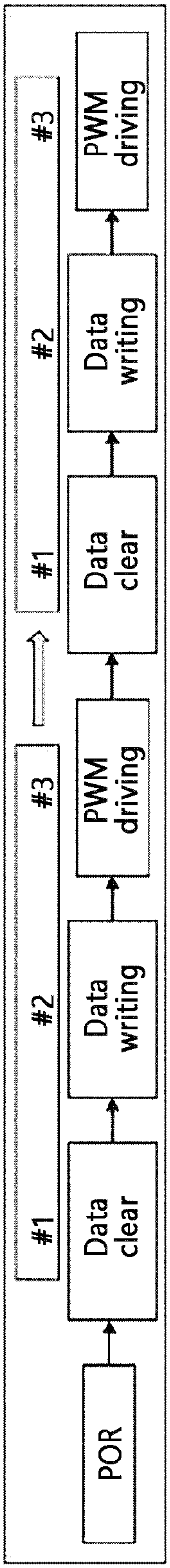
FIG. 11 is a reference diagram illustrating an order in which Mode 1 and Mode 2 operate according to the present specification.

FIG. 11 is a reference diagram illustrating an order in which Mode 1 and Mode 2 operate according to the present specification.

Referring to FIG. 11, after the POR is input first, Mode 1 (#1 and #2) and Mode 2 (#3) operate sequentially. Thereafter, Mode 1 and Mode 2 are repeatedly executed according to a video frame. The repetitive execution of Mode 1 and Mode 2 may be repeated according to the characteristics of the row signal and the column signal as described with reference to FIGS. 6 to 8. With the above characteristics, video data and setting value data may be transmitted together for each frame. In this case, even when noise occurs in the memory cell in which the setting value is stored and the stored value changes due to the noise, an error occurs only during one frame and may be quickly recovered in a next frame.

Meanwhile, depending on operation settings in the display device, there may be a case in which, during one frame, PWM driving is performed once and a case in which the PWM driving is repeatedly performed two or more times. In the present specification, an operation mode in which PWM driving is repeatedly performed M times will be named an "M-cycling operation mode." When PWM driving is performed only once as in the related art, by resetting all shift registers, the PWM driving may be ended regardless of a least significant bit (LSB) value of gradation data. On the other hand, in the M-cycling operation mode, all shift registers are reset after completing the PWM driving M times. However, when the LSB value of the gradation data is "1," a problem that the light-emitting element is continuously turned on until an MSB of the gradation data for a next PWM driving is input may occur. Thus, each PWM driving needs to be ended after the last gradation data is output.

According to an embodiment of the present specification, the pixel internal memory unit 240 may further include a plurality of PWM end memory cells for ending PWM driving of each light-emitting element.

The configuration of the pixel internal memory unit 240 according to the present specification will be described in more detail with reference to FIG. 4 again. The pixel internal memory unit 240 according to the present specification may include k shift registers corresponding to the number of light-emitting elements (LEDs). In FIG. 4, three shift registers 243-R, 243-G, and 243-B corresponding to RGB are illustrated. As described above, each of the shift registers 243 includes L video data memory cells for storing video data of each light-emitting element, that is, gradation data. In FIG. 4, a case in which gradation data of each light-emitting element has 11 bits is illustrated as an example. In addition, each of the shift registers 243 may further include one PWM end memory cell for ending the PWM driving of the light-emitting element.

The PWM end memory cell may be located adjacent to the memory cell that stores a LSB or an MSB of the gradation data of each light-emitting element.

Figure 12:
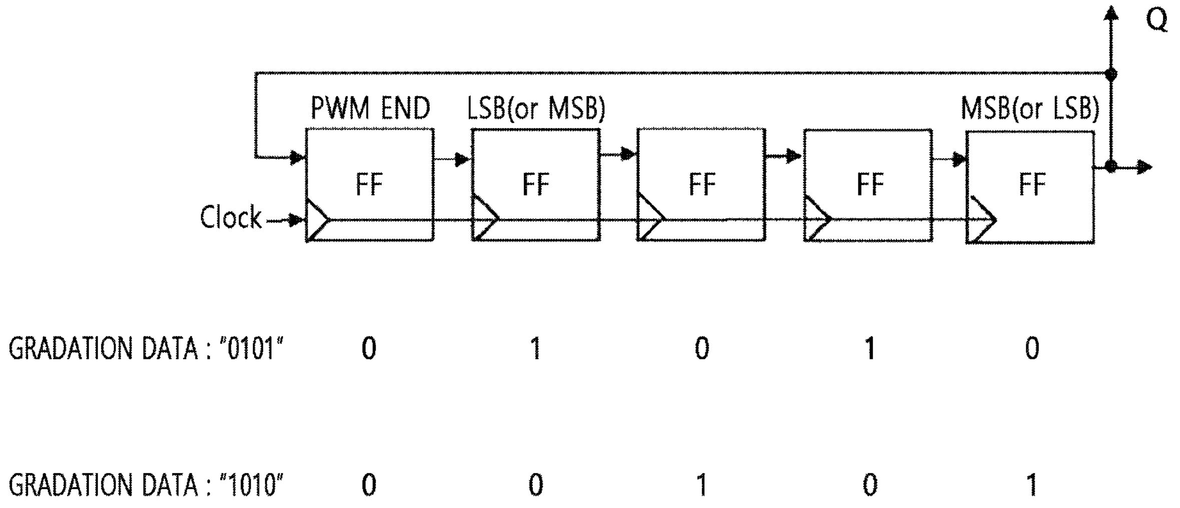
FIG. 12 is a reference diagram of a pulse width modulation (PWM) end memory cell according to the present specification.

FIG. 12 is a reference diagram of the PWM end memory cell according to the present specification.

Referring to FIG. 12, one PWM end memory cell and four video data memory cells may be confirmed. In the example illustrated in FIG. 12, it is illustrated that one PWM end memory cell is located next to the memory cell storing the LSB of the gradation data. In addition, an example of input data is also illustrated together therewith. When the gradation data of the light-emitting element (LED) is "0101," "0" of 1 bit may be added thereto, and "01010" may be input. In addition, when the gradation data of the light-emitting element (LED) is "1010," "0" of 1 bit may be added thereto, and "10100" may be input.

Referring to FIG. 4 again, the remaining configuration illustrated in the pixel internal memory unit 240 according to the present specification will be described.

The pixel internal memory unit 240 may further include K output switching elements connected to one ends of the shift registers 243, respectively, to output stored data to the respective corresponding light-emitting elements, and K cycling switching elements connected between the one ends and the other ends of the shift register 243 to re-input data output from the one ends to the other ends, respectively. In the example illustrated in FIG. 4, K=3.

The flag memory cell 241 may output the mode value stored therein as a selection signal to the K output switching elements and K cycling switching elements. Accordingly, when "1" as a mode value is stored in the flag memory cell 241, a cycling operation mode may be operated by the output switching elements and the cycling switching elements.

Meanwhile, in the cycling operation mode, the video data signal output from the data driving circuit 130 may include L-bit gradation data corresponding to a gradation of each light-emitting element and 1-bit data of "0" as PWM end data. In this case, the PWM end data is located adjacent to an LSB or an MSB of the gradation data of each light-emitting element.

Meanwhile, in the cycling operation mode, the scan driving circuit 120 may output a row signal in which M clock signals are repeated for each second scan signal according to the M-cycling operation mode.

Figure 13:
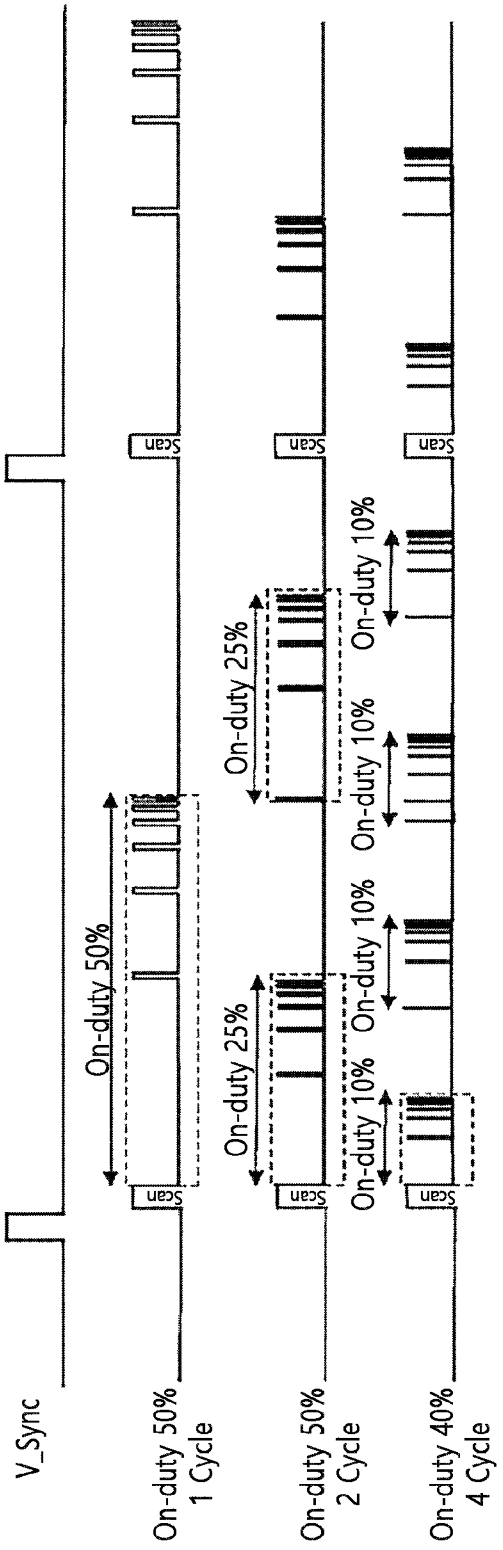
FIG. 13 is a reference diagram for a cycling operation.

FIG. 13 is a reference diagram for the cycling operation.

Referring to FIG. 13, an example of operating at 50% on duty using a 6-bit PWM is illustrated.

The scan driving circuit 120, the data driving circuit 130, and the control unit 140 according to the present specification may each include a processor, an application-specific integrated circuit (ASIC), another chipset, a logic circuit, a register, a communication modem, a data processing device, and the like known in the technical field to which the present disclosure belongs to execute calculations and various control logics. In addition, when the above-described control logic is implemented in software, the scan driving circuit 120, the data driving circuit 130, and the control unit 140 may each be implemented as a set of program modules. In this case, the program modules may be stored in a memory and executed by the processor.

The above-described computer program may include code coded in a computer language such as C/C++, C#, JAVA, Python, a machine language, or the like which may be read by a processor (CPU) of the computer through a device interface of the computer so that the computer reads programs and execute methods implemented as the programs. Such code may include functional code related to a function that defines functions necessary for executing the methods, and the like, and may include control code related to an execution procedure necessary for the processor of the computer to execute the functions according to a predetermined procedure. In addition, such code may further include code related to memory reference for which additional information or media necessary for the processor of the computer to execute the above-described functions should be referenced at any location (address) in the computer or an external memory. In addition, when the processor of the computer needs to communicate with any other computer, a server, or the like remotely located to execute the above-described functions, the code may further include code related to communication for communicating with any other computer, the server, or the like which is remotely located using the communication module of the computer, and for transmitting and receiving any information or media during the communication.

The stored medium does not refer to a medium that stores data for a short moment, such as a register, a cache, a memory, or the like, and refers to a medium that semi-permanently stores data and is readable by a device. Specifically, examples of the stored medium include a read only memory (ROM), a random access memory (RAM), a CD-ROM, a magnetic tape, a floppy disk, an optical data storage device, and the like, but the present disclosure is not limited thereto. That is, the program may be stored in various recording media on various servers which the computer may access or in various recording media on the user's computer. In addition, the medium may be distributed in a computer system connected to a network, and computer-readable code may be stored in the medium in a distributed manner.

In the above, although embodiments of the present specification have been described with reference to the accompanying drawings, those skilled in the art may understand that the present disclosure may be embodied in other specific forms without changing the technical spirit or essential features thereof. Accordingly, it should be understood that the above-described embodiments are exemplary in all respects and not restrictive.

The invention claimed is:

1. A pixel driving circuit comprising:
- a pixel internal memory comprising a plurality of memory cells configured to store a setting value related to stored data comprising pixel driving data and video data;
- a signal detection circuit comprising a row signal input terminal and a column signal input terminal;
- a first low-pass filter configured to output a first signal, which has a first frequency lower than a preset first cutoff frequency, from a signal output from the signal detection circuit; and
- a second low-pass filter configured to output a second signal, which has a second frequency lower than a preset second cutoff frequency, from the signal output from the signal detection circuit to the pixel internal memory, wherein the pixel internal memory comprises:
- a single flag memory cell configured to store a mode value;
- a setting data shift register having a plurality of setting memory cells configured to store the setting value related to pixel driving; and
- K video data shift registers corresponding to a number of light-emitting elements configured to store the video data.

2. The pixel driving circuit of claim 1, wherein the first signal is to be input to a data input terminal of the pixel internal memory configured to store the stored data.

3. The pixel driving circuit of claim 1, wherein the signal output from the signal detection circuit is to be input to a clock terminal of the pixel internal memory configured to receive a clock signal.

4. The pixel driving circuit of claim 1, wherein the second signal output from the second low-pass filter is input to a reset terminal of the pixel internal memory configured to delete the stored data.

5. The pixel driving circuit of claim 1, wherein the single flag memory cell is disposed farthest from a data input terminal of the pixel internal memory.

6. The pixel driving circuit of claim 5,
- wherein the pixel internal memory is configured to output the mode value stored in the single flag memory cell to the signal detection circuit, and
- wherein the signal detection circuit is configured to output a column signal when the mode value corresponds to a first mode, and output a row signal when the mode value corresponds to a second mode.

7. The pixel driving circuit of claim 1, further comprising:
- K output switching elements connected to first ends of the K video data shift registers, respectively, to output the video data to respective corresponding light-emitting elements; and
- K cycling switching elements connected between the first ends and second ends of each of the K video data shift registers to re-input the video data output from the first ends to the second ends, respectively.

8. The pixel driving circuit of claim 7, wherein the K video data shift registers respectively further comprise a plurality of pulse width modulation (PWM) end memory cells configured to end PWM driving of each of the light-emitting elements.

9. The pixel driving circuit of claim 8, wherein each of the PWM end memory cells is located adjacent to a least significant bit (LSB) of the video data of a corresponding light-emitting element.

10. A pixel circuit comprising:
- the pixel driving circuit of claim 1; and
- a plurality of light-emitting elements.

11. A display device comprising:
- a display panel in which a plurality of pixel circuits, each being the pixel circuit of claim 10, are disposed;
- a scan driving circuit configured to output a row signal through a plurality of scan lines connected to row signal input terminals of the pixel circuits disposed in a row direction; and
- a data driving circuit configured output a column signal through a plurality of data lines connected to column signal input terminals of the pixel circuits disposed in a column direction, wherein the column signal comprises a mode value data signal, a setting value data signal, and a video data signal.

12. The display device of claim 11, wherein the row signal comprises a first scan signal for inputting to the pixel internal memory, a second scan signal for inputting setting value data related to the pixel driving data and the video data, and a clock signal for pulse width modulation (PWM) driving.

13. The display device of claim 12, wherein the first scan signal has a frequency lower than the preset second cutoff frequency of the second low-pass filter.

14. The display device of claim 12, wherein the second scan signal has a frequency lower than the preset first cutoff frequency of the first low-pass filter and higher than the preset second cutoff frequency of the second low-pass filter.

15. The display device of claim 12, wherein the clock signal for PWM driving has a frequency higher than the preset first cutoff frequency of the first low-pass filter.

16. The display device of claim 12, wherein the scan driving circuit is configured to output the row signal, in which M clock signals are repeated, after one of the second scan signal according to an M-cycling operation mode.

17. The display device of claim 11, wherein a most significant bit (MSB) of data in the column signal is the mode value.

18. The display device of claim 11, wherein the video data comprises L-bit gradation data corresponding to a gradation of each of the light-emitting elements and 1-bit data of "0" as pulse width modulation (PWM) end data.

* * * * *